(12) United States Patent
de Gaillard

(10) Patent No.: US 6,560,930 B2
(45) Date of Patent: May 13, 2003

(54) GUIDE DEVICE FOR A WINDOW HAVING A GUIDE RAIL MOUNTED TO PIVOT SUBSTANTIALLY PARALLEL TO A PLANE OF THE WINDOW

(75) Inventor: Francois de Gaillard, Mouilleron en Pareds (FR)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 09/738,888

(22) Filed: Dec. 18, 2000

(65) Prior Publication Data

US 2001/0020347 A1 Sep. 13, 2001

(30) Foreign Application Priority Data

Dec. 17, 1999 (DE) .......................... 199 61 354

(51) Int. Cl.[7] .............................. E05F 11/44; B60J 1/17
(52) U.S. Cl. ............................. 49/376; 49/374; 49/372
(58) Field of Search .......................... 49/213, 211, 210, 49/348, 349, 372, 374, 376

(56) References Cited

U.S. PATENT DOCUMENTS

| 3,273,285 | A | * | 9/1966 | Champion ..................... 49/40 |
| 3,273,286 | A | * | 9/1966 | Brissette et al. ............... 49/227 |
| 3,591,983 | A | * | 7/1971 | Hanson ......................... 49/227 |
| 4,561,211 | A | * | 12/1985 | Raley et al. ................... 49/374 |
| 4,575,967 | A | * | 3/1986 | Bickerstaff ................... 49/211 |
| 4,586,290 | A | * | 5/1986 | Juechter ...................... 49/348 |
| 4,648,208 | A | * | 3/1987 | Baldamus et al. ............. 49/502 |
| 4,730,414 | A | * | 3/1988 | Nakamura et al. ............ 49/348 |
| 4,785,582 | A | * | 11/1988 | Tokue et al. .................. 49/211 |
| 5,062,240 | A | * | 11/1991 | Brusasco ..................... 296/153 |
| 5,142,824 | A | * | 9/1992 | Le Compagnon et al. .... 49/349 |
| 5,560,152 | A | * | 10/1996 | Haner .......................... 49/327 |
| 5,617,675 | A | * | 4/1997 | Kobrehel ..................... 49/352 |
| 5,960,588 | A | * | 10/1999 | Wurm et al. .................. 49/212 |

* cited by examiner

Primary Examiner—Gregory J. Strimbu
(74) Attorney, Agent, or Firm—Nixon Peabody LLP; David S. Safran

(57) ABSTRACT

A guide device for a window movable within a motor vehicle between an open position and a closed position for closing an opening in the motor vehicle. The device includes a first guide rail pivotally attached to the motor vehicle for pivotal motion in a plane parallel to a plane in which the window moves. The window includes a journal having a guide shoe for attachment to the first guide rail. The guide device further includes a second guide rail fixedly attached to the motor vehicle. The window further includes a slide element for attaching the window to the second guide rail. The guide device is particularly suited for use with a trapezoidal rear window of the motor vehicle.

14 Claims, 4 Drawing Sheets

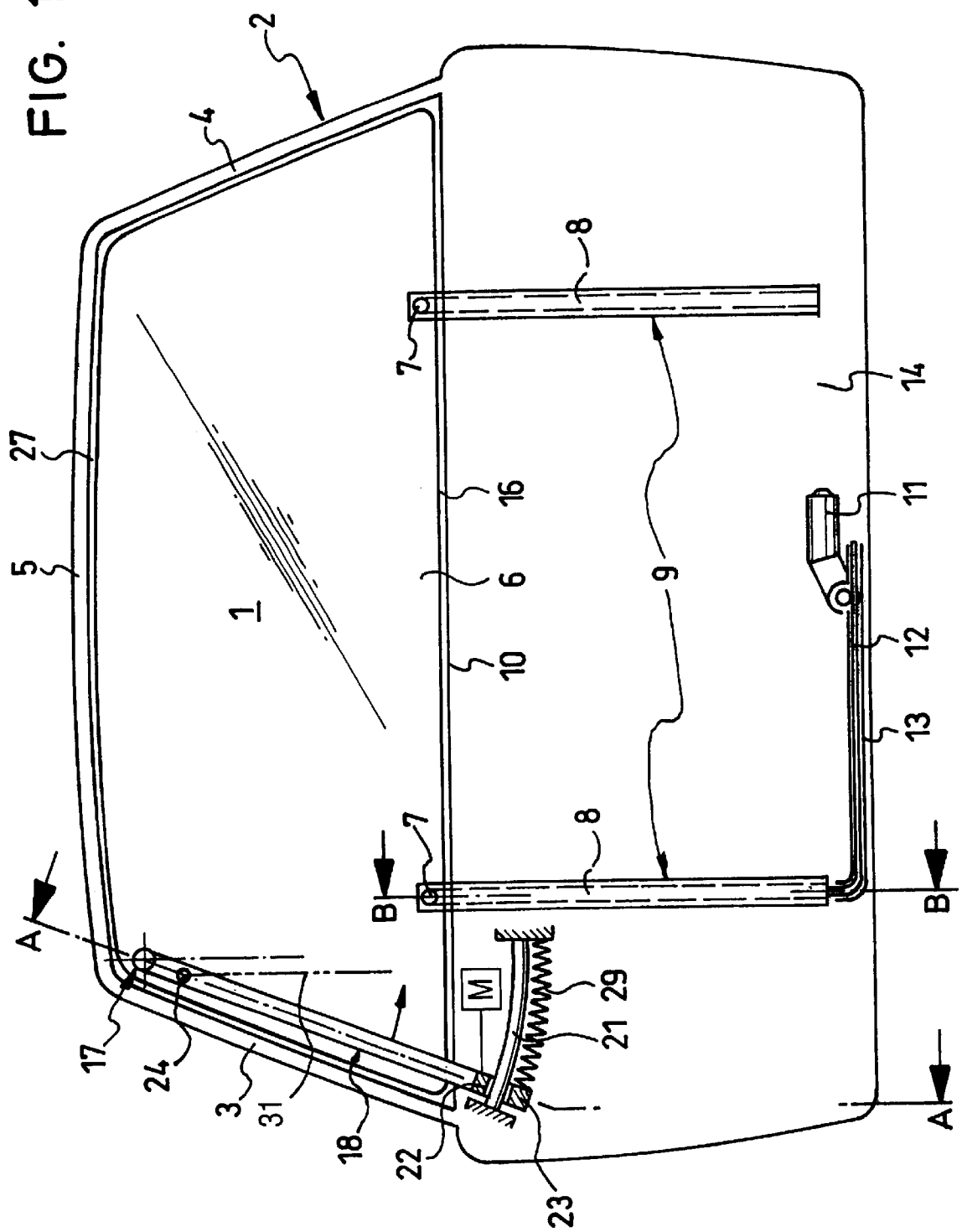

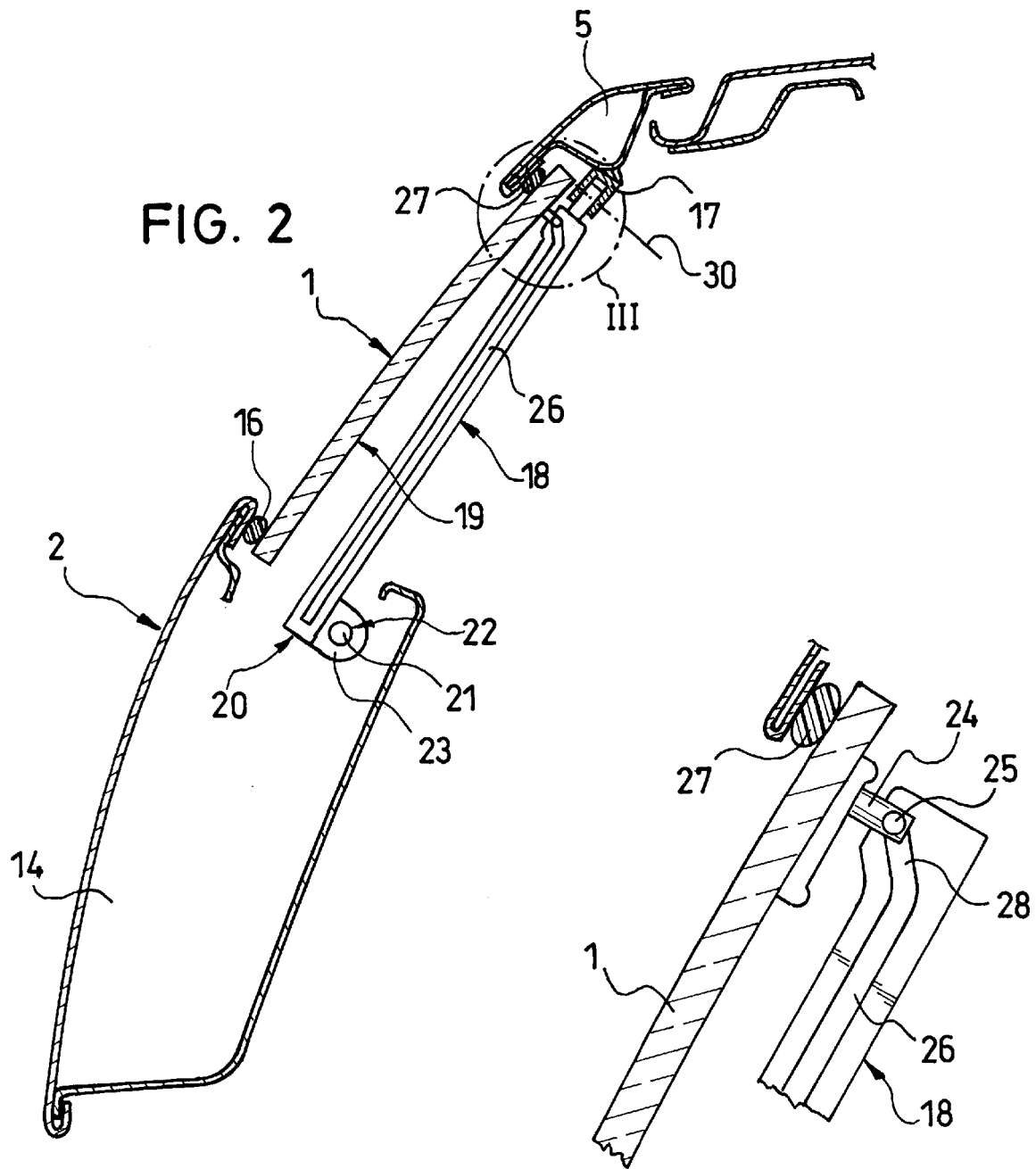

GUIDE DEVICE FOR A WINDOW HAVING A GUIDE RAIL MOUNTED TO PIVOT SUBSTANTIALLY PARALLEL TO A PLANE OF THE WINDOW

BACKGROUND OF THE INVENTION

1. Field of the Invention

The present invention is directed to a guide device for a trapezoidal window which is movably supported for opening on a body part of a motor vehicle. More particularly, the invention is directed to a guide device wherein an engagement means of the window is movably supported on a side guide rail of the window, the side guide rail being pivotally supported in a pivot bearing so as to pivot on the body part to the outside in a closed position of the window relative to a path of motion of the engagement means. When the window is opened, the side guide rail is matched to the respective position of the engagement means which moves away from the pivot bearing.

2. Description of the Related Art

Conventionally, movable or lowerable vehicle windows are opened by movably guiding the respective window on two opposing parallel sides on parallel guides of the vehicle body. For example, when a window such as a rear window that is tapered upward and thus formed to be trapezoidal, its two oblique sides cannot be guided by parallel guides on the sides of the window. Rather, there must be parallel guides within the areas of the trapezoidal sides of the window which then run through a transparent window area, and thus, adversely affect the optical appearance. The area of the trapezoidal sides of the window which is colored for example black toward the respective guide does optically cover the guide, but reduces the size of the transparent area of the rear window.

SUMMARY OF THE INVENTION

Accordingly, it is an object of the invention to devise a guide device for a window of a motor vehicle which provides additional guidance in the displacement for opening and closing the window, even for a window having opposing sides which are not parallel, for example trapezoidal windows.

The object is achieved in accordance with the present invention by providing a guide device wherein an engagement means of the window is movably supported on one side guide rail for the window, the guide rail being pivotally supported in a pivot bearing for pivoting on the body part of the motor vehicle such that it is pivoted to the outside in a closed position of the window relative to the path of motion of the engagement means of the opening window, and when the window is opened, the guide rail is matched by pivoting to the respective position of the engagement means which is moving away from the pivot bearing. Thus, the guide rail moves essentially only then into the transparent region of the window and into the window opening within the window frame when the window is being opened. With the window opened the guide rail is almost in parallel to the direction of lengthwise displacement of the window. Windows are defined as motor vehicle parts which can be opened by displacement, such as side and rear windows, and also encompasses sliding window for roofs. Instead of designations such as top edge and bottom edge which are dependent on the installation position of the window or the cover, designations such as the front edge and rear edge or the like are pertinent.

Feasibly, there are two pivoting guide rails, especially in a symmetrical arrangement on the opposing sides of the window. But also only one pivoting guide rail can be combined with another guide, for example a parallel guide, in an asymmetrical shape of a window having one straight side, i.e. a side parallel to the displacement direction, and one trapezoidal side. In addition, the guide rail on its end opposite the pivot bearing is guided on the body part. In this way the guide rail has high stability. Supporting the guide rail only in the pivot bearing with the corresponding dimensioning can be sufficient, but higher stability for the window guide can be made available by bilateral support.

In a preferred embodiment, the guide rail is pre-loaded into its outer pivot position by a force applying means, such as a spring, when opening the window the engagement means pivoting the guide rail against the force of the tensioning means. The force applied makes the guidance by the guide rail free of play. At the same time higher guidance stiffness is achieved. An alternative to pivoting the guide rail by the moving engagement means, there can be a pivoting drive which moves the guide rail into its pivot position which is matched to the position of the engagement means. The pivoting means is controlled via a control means which undertakes the pivoting motion depending on the respective position of the engagement means, for example, via an electric motor.

Preferably, there is a parallel guide means for the window essentially hidden in the body part; it is connected to the lower edge of the window which can be lowered into the body part. In doing so a drive means can be coupled to the window and the latter moved to open and close via the parallel guide means. One such parallel guide means contains two parallel guide ways on which slide elements mounted on the lower edge of the window are movably guided. Feasibly, the guide ways each have an initial section bent toward the window. Thus the window when opening is initially raised from the window seal and when closing is pressed again into the seal. In a comparable manner, the pivoting guide rail can have an initial section which is bent toward the window so that the upper edge of the window can also be raised from the seal when opening from the inside. As previously mentioned, the window can be the window pane of a motor vehicle such as a lowerable rear window as well as the cover of a sliding roof of a motor vehicle.

In the following, one embodiment of the invention is detailed with reference to the drawings.

BRIEF DESCRIPTION OF THE DRAWINGS

FIG. 1 shows in an overhead view a schematic representation of a lowerable rear window of a motor vehicle having a pivoting guide;

FIG. 2 shows in a vertical cross sectional view along the traverse A—A in FIG. 1 the pivoting guide rail;

FIG. 3 shows in an enlarged view an extract from FIG. 2; and

DETAILED DESCRIPTION OF THE INVENTION

Figure 4:
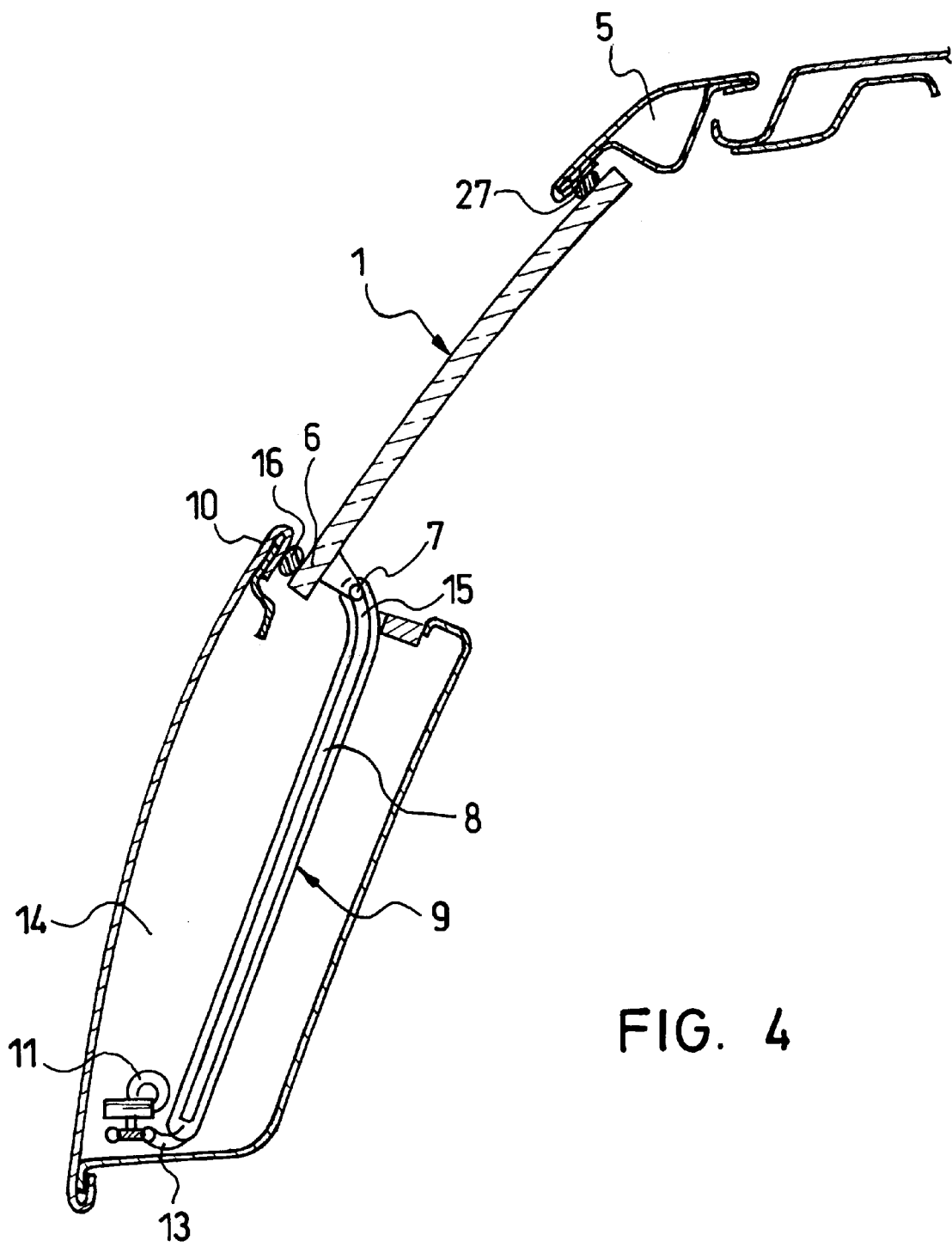
FIG. 4 shows in a vertical cross sectional view along the traverse B—B in FIG. 1 the linear guidance of the rear window.
Figure 5:
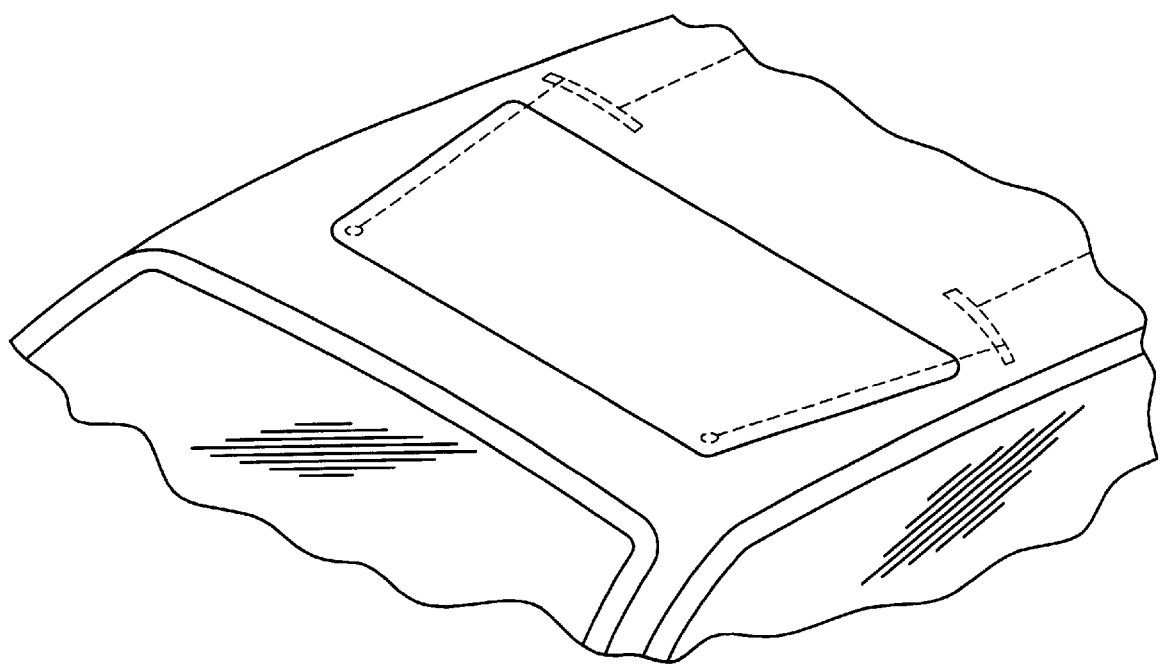
FIG. 5 shows schematic representation of an alternative embodiment of the invention wherein the window comprises a sliding roof.

Referring now to the drawings, FIG. 1 shows a rear window 1 of a motor vehicle, for example, a station wagon, that is trapezoidal-shaped according to the rear door 2 which tapers upward at left side edge 3 and right side edge 4 which run accordingly upward and obliquely inward. The rear window 1 is surrounded by a window frame 5 of the rear door 2. The rear window 1 in the area of its lower edge 6 contains two guide journals or slide elements 7 which are spaced apart and which are attached on the inside of the rear window 1 and fit into the respective guide path 8 of the parallel guide means 9 and are movably guided on it (see FIG. 4). The parallel guide means 9 with the two parallel guide paths 8 are located substantially in a vertical alignment in the bottom part of the rear door 2 and extend from the lower cross part 10 of the window frame 5 downward.

The rear door 2 houses a drive means with a drive motor 11 with gearing which is connected to the slide element 7 via a drive cable 12. The drive cable 12 is guided in a guide tube 13 which is installed along the guide path 8 originating from the drive motor 11. The drive motor 11 synchronously drives two slide elements 7. Thus, by means of the drive motor 11 the rear window 1 can be lowered on its bottom edge 6 into a bottom part 14 which defines a cavity of the rear door 2 and raised again from it. As shown in FIG. 4, the guide path 8 contains a top section 15 which is formed towards the rear window 1 as a curved path. When the rear window 1 is opened, the slide element 7 moves initially in the direction from the outside of the rear door 2 inward so that the lower edge 6 of the rear window 1 is moved inwardly off of a lower window seal 16 before the rear window 1 is lowered further into the bottom part 14 of the rear door 2.

As shown in FIGS. 1 and 2, in the top corner area of the rear door 2 on the upper cross frame of the window frame 5, a pivot bearing 17 is mounted and on which a guide rail 18 is pivotally supported. The pivot bearing 17 is located on the inside 19 of the rear window 1 facing the vehicle interior so that the guide rail 18 can be pivoted along in an essentially parallel direction to the inside 19 of window around the pivot bearing axis. A bottom end 20 of the guide rail 18 is supported on a curved guide 21 which is concentric to the pivot bearing 17 and is movable guided on it. The curved guide 21 is mounted in the rear door 2 and extends through a recess 22 of a slide piece 23 on the bottom end 20 of the guide rail 18. The curved guide 21 is arranged such that in the closed position of the rear window 1 the guide rail 18 runs roughly parallel and near the side edge 3 of the rear window 1. In doing so, an engagement means including a journal 24 is provided with a guide show 25 and which is attached via an adhesive holding device to the inside 19 of the window movably engages on or in the guide path 26 of the guide rail 18.

The engagement means 24, 25 is mounted in this position in the top corner area of the rear window 1 such that with the rear window 1 closed, the engagement means 24, 25 is located in the pivot position of the guide rail 18 shown in FIG. 1 a short distance below the pivot bearing 17. The rear window 1 is thus also securely guided in its top area perpendicular to its window surface and is held against a top window seal 27. The top end 28 of the guide path 26 of the guide rail 18 is bent comparably to the top end of the guide path 8 of the parallel guide means 9 toward the rear window 1 so that when the rear window 1 is opened the initial displacement motion lifts it from the window seal 27 to the inside.

To open the rear window 1 by means of the drive means 11, the lower edge 6 of the rear window 1 pushed down. In doing so, the engagement means 24, 25 moves down on a linear path of movement 31 (see FIG. 1) and pivots the guide rail 18 to the inside against the force of a force applying means 29 which is formed in the shape of a spring and which is located in the area of the curved guide 21. Since there are two guide rails 18 which are symmetrical to the rear window 1 and which are pressed simultaneously toward one another and against the opposing force of the force applying means 29, the rear window 1 is thus guided centered laterally relative to the rear door 2. An alternative to pivoting the guide rail 18 by the moving engagement means 24, 25, there can be a pivoting drive M which moves the guide rail 18 into a pivot position which is matched to the position of the engagement means 24, 25. The pivoting device M is controlled via a control means which undertakes the pivoting motion depending on the respective position of the engagement means, for example, via an electric motor.

An exemplary embodiment shows a rear window 1 with the pivoting guide rail 18. Instead of a rear window 1, however, a side window or the cover of a sliding roof or any other window which can be opened by displacement can have the pivoting guide rail in accordance to the present invention. The advantage of the pivoting guide rail arises especially in windows or covers with side edges which clearly deviate from two parallel lines and are especially triangular or trapezoidal.

While the present invention has been described in connection with what is considered to be the most practical embodiment, it is understood that this invention is not limited to the disclosed embodiments and may reasonable encompass various arrangements included with in the spirit and scope of the broadest interpretations and equivalent arrangements.

I claim:

1. A window system for placing a window of a motor vehicle into an open position disposed within a cavity of a motor vehicle body part and a closed position, said window system comprising:
    a pivot bearing adapted to be mounted outside the cavity of the vehicle body part;
    a side guide rail adapted to be supported on the motor vehicle body part by said pivot bearing so as to pivot in a plane which is substantially parallel to a plane of said window between laterally outward and laterally inward positions with respect to the window; and
    engagement means for moving said window to said open position and to said closed position, said engagement means being movably supported on said side guide rail,
    wherein said engagement means moves in a direction away from said pivot bearing and said side guide rail moves from said laterally outward position in a direction toward said laterally inward position as said window system moves said window into said open position.

2. The window system as claimed in claim 1, wherein said side guide rail comprises two said side guide rails each being provided for supporting a respective opposing side of said window.

3. The window system as claimed in claim 1, wherein each said guide rail is guided at an end thereof located opposite to said pivot bearing.

4. The window system as claimed in claim 1, wherein said guide rail is urged into the laterally outward position by a force applying device.

5. The window system as claimed in claim 4, wherein said engagement means pivots said guide rail against a force supplied by said force applying device as said window is placed into said open position.

6. The window system as claimed in claim 1, further comprising a pivoting drive for moving said guide rail into said laterally inward position.

7. The window system as claimed in claim 1, further comprising, in addition to said guide rail, parallel guide means adapted to be attached to a lower edge of said window for vertically guiding said window into at least said open position.

8. The window system as claimed in claim 7, further comprising a drive motor for moving said window along said parallel guide means.

9. The window system as claimed in claim 7, wherein said parallel guide means has two parallel guide paths on which slide elements adapted to be mounted on said lower edge of said window are movably guided.

10. The window system as claimed in claim 9, wherein each of said guide paths has an initial section which is adapted to be curved in a direction toward said window.

11. The window system as claimed in claim 1, wherein said guide rail has an initial section which is adapted to be curved in a direction toward said window such that, when said window is in said open position, an initial displacement motion of said guide rail from said laterally outward position toward said laterally inward position causes said window to move inwardly.

12. The window system as claimed in claim 1, wherein said window comprises a rear window of the motor vehicle.

13. The window system as claimed in claim 1, wherein said window comprises a sliding roof of the motor vehicle.

14. A window system for placing a window of a motor vehicle into an open position disposed within a cavity of a motor vehicle body part and a closed position, said window system comprising:

engagement means movable along a path for moving said window between said open position and said closed position, a side guide rail adapted to be supported on the motor vehicle body part by a pivot bearing disposed outside the cavity at a side of said window so as to pivot between laterally outward and laterally inward positions with respect to the window, said engagement means being movably supported on said side guide rail, the guide rail being in the outward position relative to the path of movement of the engagement means when the window is in the closed position, and the guide rail being progressively pivoted inwardly with respect to the window about said pivot bearing by displacement of the engagement means in a direction away from the pivot bearing during movement of the window into said open position.

* * * * *